Oct. 28, 1958 — O. M. LEE — 2,857,790
ADJUSTABLE INTERLOCKING BUSHING LINER
Filed Feb. 4, 1955
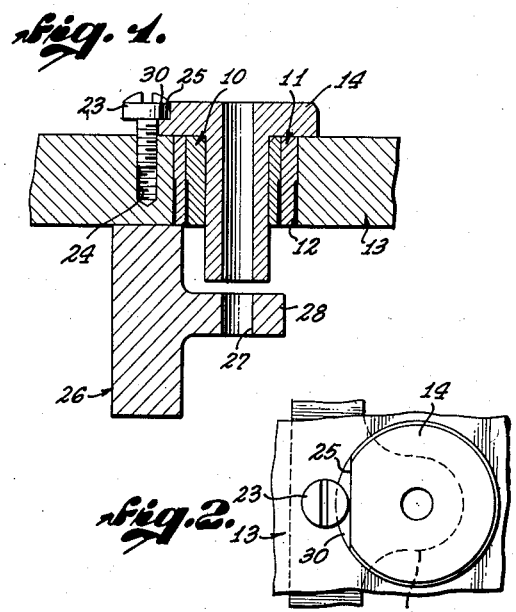
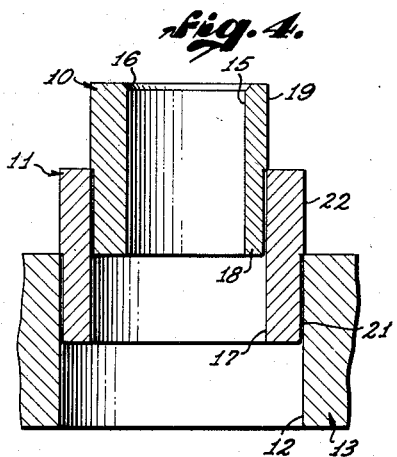
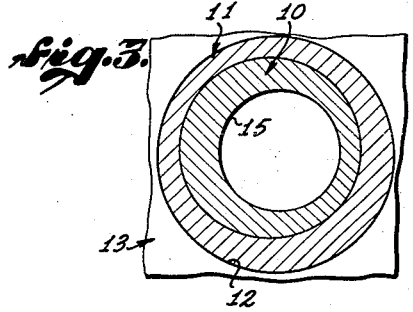
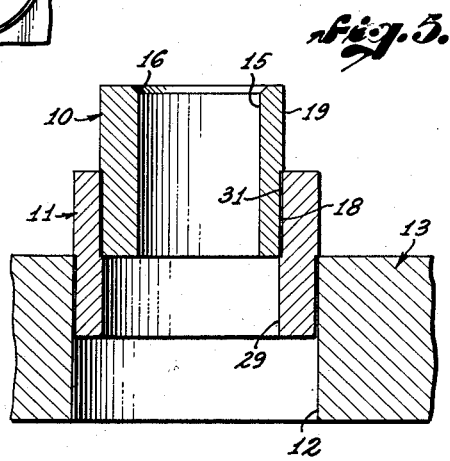
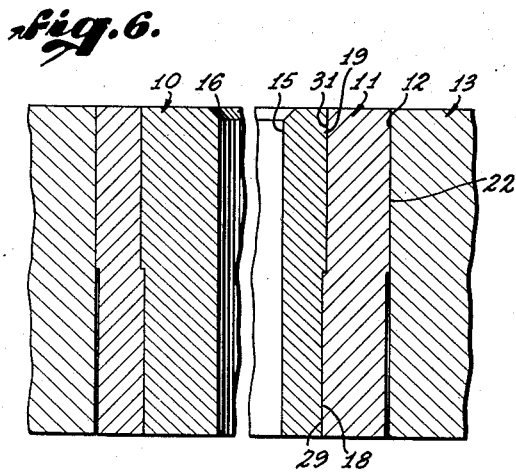
Oscar M. Lee,
INVENTOR.
BY *George W. Smyth*
ATTORNEY.

United States Patent Office 2,857,790
Patented Oct. 28, 1958

2,857,790

ADJUSTABLE INTERLOCKING BUSHING LINER

Oscar M. Lee, Los Angeles, Calif.

Application February 4, 1955, Serial No. 486,046

2 Claims. (Cl. 77—62)

This invention relates to liners for mounting drill bushings or like tool guide or inspection elements.

In tool practices today, bushing liners are primarily used for removably mounting bushings to the jig plate of a drill fixture and consist generally of tubular elements which are pressed permanently into openings or bores formed in the plate of the fixture. These liners are intended to remain in place throughout the life of the fixture and form a means for accurately locating the removable drill bushings. Such drill bushings are used principally where two or more operations are performed with the same jig or where the number of pieces to be produced will require replacement of the bushings during the life of the fixture.

As the liners are used to accurately locate the bushings, it follows that the openings of the plate receiving the liners must be very accurately located and formed. Such openings are generally formed with a jig borer for accuracy of location and even with such a machine tool the skill of the operator is important and must be of a high order to insure accurate location and formation of the openings in the plate. Many small production shops are not equipped with such expensive machine tools and consequently are not able to produce drill jigs or fixtures and must contract with others for their production requirements.

Several prior proposals have been made in an effort to eliminate the use of expensive equipment, such as a jig borer, in the production of jig plates and one prior proposal included a liner and bushing unit comprising in combination a liner having a tapered exterior wall with an eccentrically placed, tapered bore extending longitudinally therethrough for receiving a bushing having an exterior wall tapered to fit the tapered bore of the liner. The bushing was formed with an eccentrically placed bore therethrough and included means interlockingly engaging with the liner to fix the bushing against rotation from a desired adjusted position.

In the use of this previously proposed combination, a tapered bore was formed in the plate for receiving the tapered liner and by relative rotation of the liner and bushing the axis of the bore of the bushing could be accurately fixed. This proposal, although it eliminated the use of a jig borer, was not a practical solution to the problem for the tapered surfaces necessary were extremely difficult to accurately machine and a specially formed bushing was required. Furthermore, the interengaging tapered surfaces tended to rotate relative to each other during use of a fixture and this relative rotation destroyed the accuracy of the bushing location.

The bushing liner of the present invention obviates the difficulties had with prior proposals for with the liner unit of the present invention a conventional bushing can be used and it is possible to very accurately locate the axis of the bore of the bushing by ordinary inspection tools such as a heighth gauge. Furthermore, once the axis has been located the liner can be mounted within the bore of the jig plate as permanently as are standard liners today.

The bushing liner of the present invention comprises a pair of internested or telescoped tubular elements, each having a cylindrical bore eccentrically extended longitudinally therethrough. The outer element of the unit is adapted to be mounted in the opening in the plate and is exteriorly relieved intermediate the ends thereof to form opposite end portions of different diameters. As the minimum diameter of the outer element is slightly less than the diameter of the bore of the plate, the reduced end portion of the element can be partially inserted within this bore and rotated to displace the axis of the bore thereof relative ot the axis of the plate bore. The inner element is also formed with end portions of different diameters and the minimum diametered end portion can be slip fitted into the bore of the outer element after which both liner elements may be rotatably moved to accurately locate the bore of the inner element by an inspection tool, such as a heighth gauge fitted with a dial indicator. Once the two elements of the bushing have been adjusted or rotated to the positions necessary, the elements can be moved together to bring about a press-fit between the maximum diametered portion of the inner element and the bore of the outer element and the maximum diametered portion of the outer element within the bore of the plate.

In one form of the invention, the outer element is formed with a stepped bore and the two portions of the bore are equal in diameter to the two diametered wall portions of the inner element. Thus, when the inner element is fully inserted within the bore of the outer element a press-fit results throughout the entire length of the engaged bore and wall surfaces.

As the elements of the liner of the present invention permit very accurate location of the axis of the bore thereof without expansive machine tool equipment, the liner can be used not only for producing fixtures but also for inspection tools or fixtures. The liner elements would be assembled into such inspection fixtures in substantially the same way as the elements are located and mounted in production fixtures.

Other features and advantages of the present invention will be hereinafter apparent from the following description, particularly when taken in connection with the accompanying drawing, in which:

Figure 1 is a sectional view showing the liner of the present invention mounting a removable bushing and showing the jig plate in position on a production part;

Figure 2 is a fragmentary view in plan, on an enlarged scale showing means for locking the bushing against rotation relative to the jig plate;

Figure 3 is a transverse section of the liner;

Figure 4 is a view in section showing the elements of the liner in gauging position;

Figure 5 is a view similar to Figure 4 but showing a modified form of the liner; and Figure 6 is a sectional view on an enlarged scale showing the liner of Figure 5 in position in the bore of the mounting plate.

The liner of the present invention, referring now to the drawing and more particularly to Figure 4 thereof, comprises a pair of tubular elements 10 and 11, preferably of equal lengths, intended or adapted in their operative position to be telescopically interfitted or nested as shown in Figure 5 of the drawing. The outer element 11 is to be press-fitted into a bore or opening 12 formed in a jig plate 13 of a drill fixture, for example, for removably mounting a bushing 14 or a like tool guide element shown in Figure 1.

Each element is formed of a suitable hardened metal and each is formed with a cylindrical bore eccentrically extending therethrough. The bore 15 of the element 10 is countersunk, or formed as a radius, to form an annular guide surface 16 for the bushing 14 as it is telescopically fitted within the bore 15 to the position illustrated in Figure 1 of the drawing. The bore 17 of the element 11 is formed of a diameter just slightly in excess of the outer diameter of one end portion 18 of the element 10. The portion 18 is substantially half the longitudinal extent of the element and the outer diameter of this portion is slightly less than the diameter of the opposite end portion 19.

In the now preferred practice of the invention, the difference between the diameter of the bore 17 and the diameter of the end portion 18 of the element 10 is on the order of 0.0003. This difference in the diameters permits, as will be understood, free insertion and rotation of the end portion 18 within the one end of the bore 17 when the elements are in the relative position shown in Figure 4 of the drawing. The exterior cylindrical wall of the element 11 is also relieved intermediate the ends of the element to form opposite end portions 21 and 22 of different diameters. The opening 12 formed in the jig plate 13 is of a diameter just slightly in excess of the diameter of the portion 21 so that the latter portion of the element 11 can be inserted into the opening 12 and the element 11 freely rotated. In other words, the outer diameter of the end portion 21 of the element 11 is such that this portion has a slip fit within the opening or bore 12 of the jig plate.

As the bores 15 and 17 in both forms of the liner shown, are eccentrically formed relative to the elements 10 and 11, it will be seen that rotation of either or both elements will displace or adjust the position of the longitudinal axis of the bore 15 relative to the longitudinal axis of the opening or bore 12. Thus, this opening can be located with some suitable inspection tool, such as a heighth gauge or depth micrometer and then formed not by a jig borer, but by a drill press or similar machine tool. So long as the opening 12 is fairly accurately located the bushing can be accurately positioned, for any displacement of the bushing axis because of inaccurate location of the bore 12 can be corrected through adjustment of the relative positions of the elements 10 and 11. The range of adjustment possible with the liner elements may be considerable and depends, as will now be understood, on the eccentricity of the bores 15 and 17.

As the liner elements 10 and 11 can be rotated even though they are partially interfitted and the minimum diametered portion of the outer element inserted within the opening 12 in the jig plate, the rotative adjustment of the linear elements is a comparatively simple operation and does not require the services of an experienced toolmaker.

In the use of the liner of the present invention, once the opening 12 has been located and formed in the jig plate 13, the end portion 21 of the outer element 11 is mounted in the one end of the opening 12 after which the reduced end portion 18 of the inner element 10 is inserted into the bore 17 of the element 11. As the diameters of the telescopically engaged surfaces are such that each element maintains its position, but yet is free to rotate, the individual elements can now be carefully turned to the relative rotative positions required to fix the axis of the bore 15 in the position required to properly locate the bushing 14. This requires that the bore 15 be accurately formed and that the exterior cylindrical surface of the bushing 14 be carefully machined to insure proper location of the guide surface of the bushing 14.

As previously indicated, the bore of the element 10 can be located through a heighth gauge or similar inspection tool and, once located, the element 11 is now forced into the opening 12 while the element 10 is forced into the bore 17 of the outer element 11. This, as will be understood, brings maximum diametered portion 22 of the element 11 into engagement with the wall of the bore or opening 12 and the maximum diametered portion 19 of the element 10 into engagement with the wall of the bore 17. To insure that the elements are properly interlocked against rotative displacement, the outer diameter of the portion 22 is at least equal to or slightly in excess of the diameter of the bore or opening 12, and the diameter of the end portion 19 is also at least equal to or slightly in excess of the diameter of the bore 17.

In the now preferred practice of the invention, the diameter of the end portions 19 and 22 are 0.0015 greater than the diameter of the bores 17 and 12, respectively. This difference in the diameter, when the parts are pressed into the final interfitting relative positions, permanently locks the elements 10 and 11, by reason of the press fit, against rotative displacement. It will thus be seen that once the liner elements are in the interlocked position of Figure 5, they will be permanently held in that position during the life of the fixture. Furthermore, where the liner elements are each of a length equal to the thickness of the jig plate, the opposite end faces are flush with the opposite faces of the jig plate and permit use of a bushing lock to hold the bushing against rotation relative to the liner.

This bushing lock may comprise a screw element 23 threadedly mounted in a tapped opening 24 formed in the jig plate 13 adjacent each opening 12. The head of the demountable bushing 14 is formed with a milled recess presenting a shoulder 30 to be engaged under the head of the screw 23. Thus when the screw is tightened in the tapped opening to bring the undersurface of the head tightly against the shoulder 30, the bushing will be held against rotation by the interference between the element 23 and the vertical surface 25 of the milled recess.

A feature of the present invention resides in the elimination of all exterior means for holding the elements against rotative displacement in the use of the fixture. As the liner elements are held in the proper position by the press fit, the fixture can be used with parts such as indicated at 26, referring now to Figure 1 of the drawing, to machine an opening 27 in a flange 28. In the use of a fixture employing the bushing liner of the present invention, as there are no exteriorly mounted locking means to create or set up interference with the workpiece, the one face of the workpiece may actually engage under the bushing liner, as clearly illustrated in Figure 1.

There is shown in Figures 5 and 6 of the drawing a modified form of the liner of the present invention in which parts identical to the previously described form have been given the same reference characters. The embodiment shown in Figure 5 differs from the liner of the previously described form only in the formation of the bore of the outer element. In the embodiment of Figure 5 the bore of the outer element is ground with two diameters as clearly shown in the above mentioned figure of the drawing. The diameter of the portion 29 of the bore is at least as great as the diameter of the portion 18 of the inner element while the diameter of the portion 31 of the bore is substantially equal to the exterior diameter of the end portion 19 of the inner element.

In this form of the liner when the inner element is fully inserted within the bore of the outer element, a press fit results throughout the entire length of the engaged bore and wall surfaces, as clearly illustrated in Figure 6 of the drawing. It will be seen that in the form of the invention now being described the interlocking action of the telescopically engaged surfaces is greater than will be had with the form of the invention shown in Figure 4.

In either form of the invention a liquid etch material may be applied to the surfaces of the elements just prior to the full engagement or nesting of the elements and the etch material acts to fuse or bond the engaged surfaces. This fusing or bonding permanently retains the elements in their adjusted positions throughout the life of the fixture.

It should now be seen that all forms of the two-element liner of the present invention provides a means to compensate for inaccuracies in the location of the openings or bores in a jig plate or similar fixture by providing efficient means for easily adjusting the axis of the liner bore receiving the bushing or like tool guide element. This not only saves considerable time in the location of the openings in the plate, but also reduces to a minimum rejections of plates because of inaccurately located openings or bores. Furthermore, the two piece liner of the present invention permits, where necessary, some variance in the position of the bushing brought about by changes in the production of parts.

The liner elements are not expensive or difficult to form, for the different diametered portions can be accurately formed by conventional machine tool processes. The elimination of all tapered bores considerably reduces the cost and time of production of the liner elements and permits use of conventional slip renewable bushings. The particular structure of the liner elements, furthermore, eliminates the necessity of any separate means for locking the liner elements against accidental displacement.

Although the embodiment of the invention illustrated has been described as one particularly useful in the formation of jig plates or drill fixtures, it should be understood that the liners can be used in any fixture requiring accurate location of either tool or inspection elements. The liner of the present invention thus makes possible the production of relatively inexpensive inspection tooling and without the necessity of expensive machine tool equipment heretofore necessary.

Although the now preferred embodiments of the present invention has been shown and described herein, it is to be understood that the invention is not to be limited thereto, for it is susceptible to changes in form and detail within the scope of the appended claims.

I claim:

1. A bushing liner to be mounted in a cylindrical opening of a mounting plate, comprising: an outer element, circular in cross-section, having one end portion of a diameter slightly less than the diameter of said opening, the opposite end portion of said element having a diameter substantially equal to the diameter of said opening; said element having an eccentrically placed cylindrical bore longitudinally extending therethrough, the diameter of said bore being enlarged at the one end portion thereof; an inner element to be telescopically fitted within said bore, circular in cross-section, and having one end portion of a diameter slightly less than the enlarged diametered portion of said bore with the opposite end portion of a diameter substantially equal to said enlarged diametered portion; the smaller diametered portion of the inner element having a diameter substantially equal to the smaller diametered portion of the bore of said outer element; said inner element having an eccentric bore longitudinally formed therethrough for receiving and mounting an element to be used with said liner.

2. A two-element liner to be mounted in a cylindrical opening of a mounting plate, comprising: an outer element, circular in cross section, having one end portion of a diameter slightly less than the diameter of said opening and extending axially whereby the said end portion can be rotatably received within said opening; the opposite end portion of said outer element having a smooth surface with a diameter substantially equal to the diameter of said opening and extending axially; said element having an eccentrically placed cylindrical bore longitudinally extending therethrough having at least a first diameter; an inner element to be telescopically fitted within said cylindrical bore, circular in cross section, and having a first end portion of a diameter slightly less than the first diameter of the bore of said outer element and extending axially; the opposite end portion of said inner element having a smooth surface with a diameter substantially equal to the first diameter of the bore of said outer element and extending axially; the reduced diametered end portion of said outer element permitting reception and rotative adjustment of said outer element within the opening of said plate and the reduced diametered end portion of the inner element permitting reception and rotative adjustment of the latter within the bore of said outer element; said elements being frictionally locked relative to each other and said mounting plate when the large diametered portions of the inner and outer elements are engaged, respectively, with the walls of the bore and opening; said inner element having an eccentric bore longitudinally formed therethrough for receiving and mounting an element to be used with said liner.

References Cited in the file of this patent

UNITED STATES PATENTS

| 1,703,549 | Sergeef | Feb. 26, 1929 |
| 2,381,943 | Williams | Aug. 14, 1945 |
| 2,424,485 | Miller | July 22, 1947 |

FOREIGN PATENTS

| 704,122 | Great Britain | Feb. 17, 1954 |